United States Patent [19]
Lox et al.

[11] 3,753,756
[45] Aug. 21, 1973

[54] RETICULATED POLYURETHANE FOAM AND METHOD OF MAKING SAME

[76] Inventors: Walter E. Lox, 427 Shabbona, Park Forest, Ill. 60466; William Petrich, 3426 Maple Lane, Hazel Crest, Ill. 60429.

[22] Filed: Sept. 10, 1971

[21] Appl. No.: 179,547

[52] U.S. Cl............... 117/8, 117/118, 117/138.8 D
[51] Int. Cl. ............................................. B44c 1/22
[58] Field of Search................ 117/8, 138.8 D, 118, 117/98; 260/2.5 A, 2.5 BD; 264/48

[56] References Cited
UNITED STATES PATENTS

| | | | |
|---|---|---|---|
| 2,961,710 | 11/1960 | Stark | 264/321 X |
| 3,125,542 | 3/1964 | Haines | 264/321 X |
| 3,171,820 | 3/1965 | Volz | 117/138.8 D |
| 3,175,025 | 3/1965 | Geen et al. | 264/321 X |
| 3,175,030 | 3/1965 | Geen | 264/321 |
| 3,297,803 | 1/1967 | Meisel et al. | 264/321 |
| 3,329,759 | 7/1967 | Rice | 264/321 |
| 3,353,994 | 11/1967 | Welsh et al. | 117/138.8 D |
| 3,390,106 | 6/1968 | Geen et al. | 264/321 X |
| 3,405,216 | 10/1968 | Garrett et al. | 264/321 |
| 3,456,047 | 7/1969 | Vinton et al. | 264/321 X |

*Primary Examiner*—William D. Martin
*Assistant Examiner*—Theodore G. Davis
*Attorney*—Carlton Hill, J. Arthur Gross, et al.

[57] ABSTRACT

Reticulated polyurethane foam produced by contacting the flexible foam, either of the polyether or polyester type, with orthotoluidine. In the highly preferred embodiment of the invention, the reticulation by means of ortho-toluidine is accompanied by coating the strands and nexi of the polyurethane skeletal structure with polyvinylpyrrolidone to render the polyurethane substantially non-toxic.

5 Claims, No Drawings

RETICULATED POLYURETHANE FOAM AND METHOD OF MAKING SAME

BACKGROUND OF THE INVENTION

1. Field of the Invention

This invention is in the field of reticulated polyurethane foam and is concerned with an improved process for reticulating the foam and concurrently depositing a coating on the skeletal structure which renders the resulting reticulated foam substantially non-toxic.

2. Description of the Prior Art

The chemistry of polyurethane resin foam is well known and highly developed and therefore will be touched upon only briefly here. Polyurethane resin foams of the polyether and polyester type are produced by the reaction of a wide variety of polyols with isocyanates. To produce a flexible foam of high molecular weight, low functionality polyols are used so that a small amount of crosslinking results. Typical isocyanates used in urethane production are toluene diisocyanate and polyphenyl polyisocyanates. The polymeric structure of the foam is produced by the reaction of the isocyanate with the polyol. Simultaneously, the isocyanates react with any water present to form carbon dioxide bubbles within the polymer structure which expand the structure to the desired density. In systems employing a fluorocarbon blowing agent, water is not usually used, and these foam structures are formed by expansion of the low boiling fluorocarbon, due to the exothermic heat produced by the polyol-isocyanate reaction.

A flexible polyurethane foam is essentially a three dimensional network of interconnecting strands of a polyurethane resin, the strands being integrally interconnected by thickened nexi to form a skeleton including polyhedrons whose faces are polygonal. Flexible foam, as produced, normally contains thin membranes of polyurethane, sometimes referred to as windows, bridging between the strands of the skeleton and forming the polygonal faces.

For some applications of polyurethane foam, particularly for filtering puroses, it is desirable to eliminate the membranes, a process which is referred to as reticulation. There are a number of different methods in the prior art for achieving reticulation. Garrett et al., in their U.S. Pat. No. 3,405,216 described treating a flexible polyether polyurethane foam with a solution of either potassium permanganate or an acidic solution of ceric sulfate. U.S. Pat. No. 2,961,710 to Stark describes a reticulation process which involves soaking the foam in a weakening agent, coupled with violent agitation. Haines U.S. Pat. No. 3,125,542 describes a reticulation process involving treatment of the foam with an alkaline solution containing a monohydroxy glycol ether. U.S. Pat. No. 3,171,820 to Volz and Belgian Pat. No. 543,362 to Bauer describe reticulation processes involving the use of hydrolyzing agents for the membranous polyurethane. U.S. Pat. Nos. 3,175,025 and 3,390,106 to Geen as well as U.S. Pat. No. 3,297,803 to Meisel et al. and U.S. Pat. No. 3,456,047 to Vinton et al. describe various forms of explosion processes where the membranes are ruptured by subjecting them to the explosive action of ignitable gases within a closed pressure vessel.

U.S. Pat. No. 3,175,030 to Geen describes a reticulation process involving the use of light pulses. Rice U.S. Pat. No. 3,329,759 describes still another type of reticulation process which involves rapidly increasing and decreasing the pressure of a gas about the confined foam.

Despite this significant body of art in the field of reticulation of polyurethane foams, each of these foams of the prior art is still toxic and therefore cannot be used in applications such as the filtration of body fluids or food products where the foam would otherwise be suitable. The need still remains, therefore, for providing a reticulated foam which can be employed as a filter medium for liquids under non-toxic conditions. The satisfaction of that need is a principal object of the present invention.

SUMMARY OF THE INVENTION

In the particularly preferred form of the present invention, a polyether or polyester type polyurethane foam is subjected to controlled contact with an aqueous solution of ortho-toluidine, the solution also containing a relatively small amount of polyvinylpyrrolidone which has the capability of reacting with the polyurethane strands and nexi and provide a hydrophobic, non-toxic coating thereover. The reticulation bath, containing the orthotoluidine and the polyvinylpyrrolidone in a suitable carrier can be made self-replenishing by the incorporation of suitable enzymes in the bath, which enzymes have the capability of digesting the membranous polyurethane which is being concurrently removed by the action of the ortho-toluidine.

The extent of reticulation, of course, is governed by the process conditions existing in the bath. Temperatures of 100° to 160° F. have been found satisfactory, and treating times of 10 minutes or less can be used at these temperatures to provide adequate reticulation while at the same time preventing degradation of the strands and nexi.

DESCRIPTION OF THE PREFERRED EMBODIMENTS

The process of the present invention can be operated on a continuous or intermittent basis. It involves thoroughly impregnating the polyurethane foam with an aqueous solution containing ortho-toluidine at a temperature ranging from about 100° to 160° F., for treatment times of up to 10 minutes. Lower temperatures can be used, but the times of treatment become excessively long. A temperature of about 140° F. is preferred, since the treatment time involved at this temperature is about 2.5 minutes.

It should also be mentioned that complete reticulation is not always necessary nor even desirable in some instances. Accordingly, in those instances where less than complete membrane removal is desired, less severe conditions of temperature and treatment time will be used.

After the desired amount of reticulation has been achieved, as determined by a few simple tests, the treating solution is withdrawn and the foam is thoroughly flooded with water to get rid of the residual treating solution. Finally, the foam can be dried with heated air currents.

The process of the resent invention is applicable to polyurethane foams generally, such foams typically having 10 to 80 pores per inch.

The reticulating agent, ortho-toluidine is sparingly soluble in water, but sufficiently soluble to meet the desired range of 0.05 by 1 percent by weight of toluidine in the bath. More preferably, the concentration of orthotoluidine is 0.1 to 0.3 percent by weight.

While ortho-toluidine is the preferred reticulating agent, a portion of the concentration of this material can be replaced by metatoluidine.

The reticulation bath also includes, in the preferred embodiment of the present invention, a polyvinylpyrrolidone preferably having a molecular weight of from 50,000 to 100,000. This material is a powder which is not readily dispersible in the bath, and for that reason, we find it desirable to combine it with a dispersing agent which is compatible with the other ingredients in the bath. We have found that a potassium-barium partial ester of polyvinyl acetate having a molecular weight of from 10,000 to 15,000 is a particularly suitable dispersing agent for the polyvinylpyrrolidone. The partial ester, which normally includes equal parts by weight of potassium and barium, and is believed to be essentially a half ester of the polyvinyl acetate is manufactured by the Caron Company, a division of BYK Gulden. The polyvinylpyrrolidone and the partial ester apparently form a complex. For most uses, the complex should contain about 5 to 10 percent by weight of the polyvinylpyrrolidone.

The solubility of the polyvinylpyrrolidone in the half ester can be improved by adding swelling agents such as tetrahydrofuran. This material also facilitates the reticulation process by opening the pores of the polyurethane to facilitate introduction of the treating solution. Other swelling agents such as chlorinated solvents, aromatic hydrocarbons, ketones, esters, and alcohols can also be employed.

The complex of potassium-barium half ester and polyvinylpyrrolidone preferably constitutes 5 to 20 percent by weight of the bath, and in the particularly preferred embodiment, this complex is present in an amount of 7 to 12 percent by weight. The swelling agent may be added in amounts of from 0 to 1 percent, and preferably at 0.05 to 0.5 percent.

We have also found that we can include enzymes in the solution to markedly prolong the life of the solution. These enzymes are commercially avilable materials which have the capability of digesting the membranous polyurethane removed by the ortho-toluidine, cleansing the solution of many residual salts and foreign matter normally found in the urethane foam. The enzyme concentration may run from about 0.1 to 1 percent by weight of the bath, and preferably from 0.2 to 0.6 percent by weight. Suitable enzymes are marketed by the Rohm & Haas Company under the trademark "Rhozyme H-39," "Rhozyme C-L," "Rhozyme B-6" and "Protease 30." "Rhozyme H-39" has heretofore been used in industrial waste treatment formulation because of its strong starch liquefying activity. "Rhozyme C-L" is a crude enzyme product which breaks down fats and fatty acid esters to fatty acids and glycerol or alcohol. "Rhozyme B-6" is a crude enzyme product which has marked protein solubilizing activity, but also exhibits good starch liquefying activity. "Protease 30" is also a crude enzyme product which has good protein solubilizing activity.

The following specific examples are offered purely for the purpose of illustrating the wide variety of compositions and treatment conditions which can be employed in the practice of the present invention.

EXAMPLE 1

To illustrate the utility of ortho-toluidine as the reticulating agent, a concentrated solution of ortho-toluidine in glacial acetic acid is combined with an equal part by weight of sodium hypochlorite. The solution was exothermic in its action and have a deep indigo color to the foam. Visual observation indicated that all of the membranes throughout the foam had been removed by the treatment of a few minutes duration at 100° F.

EXAMPLE 2

The treating solution in this instance contained 2.7 percent by weight of a 15 percent solution of metatoluidine, 2.7 percent of a 15 percent solution of ortho-toluidine, 8.1 percent of a complex produced by treating a potassium-barium half ester of vinyl acetate with 7½ percent by weight of polyvinylpyrrolidone, 5.4 percent of an enzyme blend solution containing equal parts of "Rhozyme H-39," "Rhozyme C-L," "Rhozyme B-6," and "Protease 30," utilizing 20 parts by weight of the blend to 100 parts of water. The remainder of the composition was water, except for the glacial acetic acid which was used to dissolve the metatoluidine and the ortho-toluidine.

Pieces of polyurethane foam were immersed in the solution and squeezed from time to time for 2½ hours at room temperature. The pieces were then rinsed in water and allowed to dry in air. Visual examination of the specimens indicated substantially complete reticulation, and a substantial coating of the skeletal strands and nexi with a hydrophobic coating of polyvinylpyrrolidone.

EXAMPLE 3

In this example, the reticulation solution contained 56.2 percent of the potassium-barium complex of polyvinylpyrrolidone as set forth in Example 2, 5.2 percent by weight of a 15 percent solution of ortho-toluidine in glacial acetic acid, 10.5 percent of the enzyme solution referred to in Example 2, 5.3 percent by weight of tetrahydrofuran, and 26.4 percent water. This solution was a concentrate which was further diluted at a ratio of 26 parts concentrate to 100 parts water to form the treating solution. Pieces of polyurethane foam were immersed in the diluted solution at 140° F. for 2½ minutes, and squeezed from time to time. The pieces were then rinsed with water and allowed to dry. There was substantially complete reticulation of the polyurethane foam, and a residual coating remained over the strands and nexi, rendering the foam substantially nontoxic. After an interval of 3 months, the foam showed no apparent degradation or loss of properties.

The reticulation compositions of the present invention can also include other additives for diverse purposes. For example, the reticulation bath may contain coloring material or fire retarding agents as well as chelating agents for eliminating specific metals from the liquid or gas being filtered.

It should be evident that various modifications can be made to the described embodiments without departing from the scope of the present invention.

We claim:

1. The method of reticulating a flexible polyurethane foam which comprises contacting said foam with an aqueous solution of from 0.05 to 1 percent by weight of orthotoluidine, simultaneously reacting the strands of the foam skeleton with polyvinylpyrrolidone to form an integral coating thereon, and terminating the contacting when said foam is at least partially reticulated.

2. The method of claim 1 in which said polyvinylpyrrolidone is present in the form of a complex with a potassium-barium partial ester of polyvinyl acetate in which said polyvinylpyrrolidone constitutes from 5 to 10 percent by weight.

3. The method of claim 1 in which said aqueous solution contains from 5 to 20 percent by weight of an agent consisting essentially of a complex between a potassium-barium partial ester of polyvinyl acetate and polyvinylpyrrolidone containing 5 to 10 percent by weight of the latter, and additionally contains from 0.5 to 1 percent by weight of enzymes capable of digesting membranous polyurethane, from 0 to 1 percent by weight of a swelling agent, and the balance essentially water.

4. The method of claim 1 in which said aqueous solution also contains enzymes capable of digesting the membranous polyurethane removed by the action of the ortho-toludine.

5. The method of claim 3 in which the contacting is carried out at a temperature of from 100 to 160 °F., for a time not in excess of 10 minutes.

* * * * *